United States Patent [19]

Bettinger et al.

[11] 4,352,744
[45] Oct. 5, 1982

[54] PROTECTING COLLOIDAL SILICA AQUASOLS FROM BACTERIAL DEGRADATION

[75] Inventors: George E. Bettinger, Wilmington, Del.; John N. Orban, Highland, Ind.

[73] Assignee: E. I. Du Pont de Nemours and Company, Wilmington, Del.

[21] Appl. No.: 184,211

[22] Filed: Sep. 5, 1980

[51] Int. Cl.³ ............................................. B01J 13/00
[52] U.S. Cl. ............................. 252/313 S; 106/287.34
[58] Field of Search .................... 252/313 S; 424/226; 106/287.34

[56] References Cited

U.S. PATENT DOCUMENTS

| | | | |
|---|---|---|---|
| 2,823,186 | 2/1958 | Nickerson | 252/313 |
| 3,046,234 | 7/1962 | Roman et al. | 252/313 S |
| 3,148,110 | 9/1964 | McGahen | 167/26 |
| 3,336,236 | 8/1967 | Michalski | 252/313 |
| 3,377,275 | 4/1968 | Michalski et al. | 252/313 S X |
| 3,697,220 | 10/1972 | Schwartz | 424/226 X |
| 3,816,330 | 6/1974 | Havens et al. | 252/313 |
| 3,860,431 | 1/1975 | Payne et al. | 252/313 S X |

FOREIGN PATENT DOCUMENTS 799440  11/1968  Canada .

Primary Examiner—Richard D. Lovering

[57] ABSTRACT

Colloidal silica aquasols containing about 200-675 ppm 1-(3-chloroallyl)-3,5,7-triaza-1-azoniaadamantane chloride; 100-350 ppm 1,2-benzisothiazolin-3-one; or 160-800 ppm of 1,3,5-triazine-1,3,5 (2H,4H,6H)-triethanol are protected from contamination by microorganisms which cause undesirable changes in physical properties. This treatment prevents discoloration, bad odor and slime formation and increases the shelf life of colloidal silica sols to more than one year.

4 Claims, No Drawings

PROTECTING COLLOIDAL SILICA AQUASOLS FROM BACTERIAL DEGRADATION

DESCRIPTION

1. Technical Field

This invention relates to a method of protecting colloidal silica aquasols against bacterial contamination.

2. Background Art

Colloidal silica sols are widely used in such diverse compositions as adhesives, paints, textile coatings, carpet treating agents, floor waxes and coatings, catalyst compositions, and others.

It is generally well known in the art that certain silica aquasols, particularly those which contain trace elements, provide a nutrient system in which bacteria or other microorganisms, which have not been fully identified, grow; and the byproducts of such growth contaminate the aquasols. An investigation isolated twenty-one separate organisms, at levels as high as $10^8$ cfu/ml (colony forming units per milliliter) from silica aquasols. These organisms were both gram positive and negative, bacillus and coccus shaped. The contamination by the bacteria results in colored and clear slime, floating and sinking floc, product coloration ranging from off-white to black, product viscosity increases, occasionally a sulfide-like odor, as well as other effects.

Attempts have been made in the past to incorporate into colloidal silica aquasols effective bacteriostatic agents, which would prevent the above undesirable changes from occurring. A considerable success was achieved by adding to silica sols up to about 250 ppm of formaldehyde, as described in U.S. Pat. No. 3,148,110 (to McGahen). Canadian Pat. No. 799,440 discloses the addition of a hexamine-halohydrocarbon quaternary compound. U.S. Pat. No. 3,816,330 discloses the addition of 10–1,000 ppm of hexachlorophene. Other prior art efforts included use of hydrogen peroxide or of sodium hypochlorite as silica sol bacteriostats.

While all such methods provided protection against microorganisms, some of them had certain undesirable features which made them impractical. Formaldehyde, for example, is volatile and can gradually escape from storage containers which are imperfectly closed. In many end uses formaldehyde odor is objectionable. Also, formaldehyde can undergo chemical reactions that render it ineffective. Both sodium hypochlorite and hydrogen peroxide are decomposed by sunlight. Hexamine-halohydrocarbon quaternaries are relatively expensive. In some grades of colloidal silica sols strains of hexachlorophene resistant bacteria have developed; such bacteria have caused the formation of slime. Some bactericides are toxic or carcinogenic and this create safety problems in handling. In addition, many potential bacteriostatic candidates are unsuitable because they are not physically compatible with colloidal silica sols. They often cause gelation of the sol, cause floc or increase its viscosity or impart an undesirable color or odor or increase the turbidity or cause foaming. Certain candidates are stable only in certain narrow pH ranges, which may be outside of the optimum pH range for a given silica sol. Other candidates require such a large amount of chemical to be present that the candidates then become contaminants to the product.

There is a need, therefore, for an effective antibacterial agent which would be compatible with commercial colloidal silica sols, which would control the whole spectrum of microorganisms normally encountered in such sols, and which would retain its activity for a practical period, for example, six months to one year. With respect to the last requirement mentioned above, some bactericides produce an initial kill but are ineffective against bacteria that are subsequently introduced in the silica aquasol.

DISCLOSURE OF THE INVENTION

According to this invention, it has now been discovered that colloidal aqueous silica sols are effectively protected against bacterial contamination by addition to such sols of about 200–675 ppm 1-(3-chloroallyl)-3,5,6-triaza-1-azoniaadamantane chloride; 100–350 ppm 1,2-benzisothiazolin-3-one; or 160–800 ppm of 1,3,5-triazine-1,3,5(2H,4H,6H)-triethanol.

DETAILED DESCRIPTION OF THE INVENTION

Colloidal silica sols are dispersions of 15–60 percent by weight discrete spherical particles of surface-hydroxylated silica in water. The silica particles are in the form of spheres. These opalescent liquids have a slight bluish cast. Commercially available aquasols normally contain from 15–60 weight percent $SiO_2$, whose particle size ranges from 2–100 m$\mu$. The pH of these aquasols usually ranges from 7.5–10.5, and they are generally stabilized by a small amount of sodium hydroxide or ammonium hydroxide.

Colloidal silica sols which can be protected in the manner contemplated by the present invention are all those colloidal silica aquasols which are normally attacked by bacteria or other microorganisms with resulting deterioration and loss of acceptable appearance. Such colloidal silica sols are sold, for example, by the Du Pont Company under the trade name Ludox®. Of the grades of Ludox® sols presently available, the grades indicated as HS, LS, SM, TM, AS, WP, CL-X and AM are susceptible to bacterial attack. Other commercial sols which can also be treated by the method of the invention are the "Nalcoag" silica sols sold by Nalco Chemical.

The useful bactericides are known in the art and are commercially available.

1,3,5-Triazine-1,3,5(2H,4H,6H)-triethanol is available from Sterling Drug Company under the trademark Grotan® BK as a formulation containing 78.5% active. This bactericide formulation is liquid and it is soluble in water and colloidal silica aquasols.

1,2-Benzisothiazolin-3-one is available from ICI under the trademark Proxel® CRL as a formulation containing 31–35% active. This formulation is liquid and it is soluble in colloidal silica aquasols with mild agitation.

1-(3-Chloroallyl)-3,5,7-triaza-1-azoniaadamantane chloride is available from Dow Chemical Company under the trademark Dowicil® 75 as a formulation containing 67.5% active. This formulation is a powder that is soluble in colloidal silica aquasols with mild agitation.

The bactericides can be added to the colloidal silica aquasol in any convenient manner, i.e., to storage tanks or to shipping containers while they are being filled. In view of their solubility, little or no agitation is required.

Once added, the bactericides do not cause any significant changes in the chemical or physical properties of the colloidal silica aquasol. A slight green color was noted with the use of 1,2-benzisothiazolin-3-one in some instances. Silica aquasols treated with the biocides have demonstrated product stability in 6-month storage tests.

The following activity tests were conducted to demonstrate the biocidal activity of the three bactericides.

EXAMPLE

The following colloidal silica aquasols were used during the test:

Ludox® AM colloidal silica (E. I. du Pont de Nemours & Co., Alumina-Modified colloidal silica aquasol having a pH of 9.1, a viscosity of 14.4, 30 percent by weight silica and a particle size of 13–14 m$\mu$) and Ludox® TM (E. I. du Pont de Nemours & Co., colloidal silica aquasol having the average particle size of 22 m$\mu$, a pH of 9.2, a viscosity of 41.7 and about 50 percent by weight silica).

Samples of these sols treated with bactericide as well as untreated control samples were inoculated with a mixed culture of twenty-one strains of bacteria previously isolated from colloidal silica aquasols. While many of these bacteria have not been identified, the majority belonged to the following, morphologically distinct, four groups:

a. Small gram-negative, rod-shaped bacterium producing an irregular, smooth, raised translucent spreading colony on Trypticase Soy Agar.
b. Large gram-negative, rod-shaped bacterium producing a circular, mucoid, convex, white colony on Trypticase Soy Agar.
c. Gram-negative, rod-shaped bacterium producing a circular, smooth, convex, yellow colony on Trypticase Soy Agar.
d. Gram-positive, rod-shaped bacterium producing a circular, smooth, convex, pink colony on Trypticase Soy Agar.

The samples were stored at 36.6° C. The concentrations of bacteria were determined by quantitative plating on Trypticase Soy Agar. The following results were obtained at the time indicated:

| Material | Bacteria Count (cfu/ml) | |
|---|---|---|
| | Initial | After 6 Months |
| Ludox® AM with 300 ppm Proxel® CRL (100 ppm active) | 0 | 0 |
| Ludox® AM with 300 ppm Dowicil® 75 (200 ppm active) | 0 | 0 |
| Ludox® AM with 200 ppm Grotan® BK (160 ppm active) | 0 | 0 |
| Ludox® TM with 300 ppm Proxel® CRL (100 ppm active) | 0 | 0 |
| Ludox® TM with 300 ppm Dowicil® 75 (200 ppm active) | 0 | 0 |
| Ludox® TM with 200 ppm Grotan® BK (160 ppm active) | 0 | 0 |
| Untreated Samples | | |

-continued

| Material | Bacteria Count (cfu/ml) | |
|---|---|---|
| | Initial | After 6 Months |
| Ludox® TM | $4 \times 10^6$ | $1 \times 10^4$ |
| Ludox® AM | $8 \times 10^6$ | $5 \times 10^2$ |

A sample of Ludox® AM was tested for the physical effect of the bactericide on the silica sol and the following results obtained:

| Material | pH | | Viscosity | |
|---|---|---|---|---|
| | Initial | After 8 Months | Initial | After 8 Months |
| Ludox® AM Untreated Control | 8.95 | 8.96 | 9.42 | 6.2 |
| Ludox® AM + Proxel® CRL (100 ppm active) | 8.97 | 8.97 | 7.73 | 5.2 |
| Ludox® AM + Dowicil® 75 (200 ppm active) | 9.00 | 8.95 | 6.57 | 6.4 |
| Ludox® AM + Grotan® BK (160 ppm active) | 9.2 | 8.98 | 9.1 | 6.9 |

| Material | Turbidity | |
|---|---|---|
| | Initial | After 8 Months |
| Ludox® AM Untreated Control | 9.3 | 7.0 |
| Ludox® AM + Proxel® CRL (100 ppm active) | 10.2 | 9.3 |
| Ludox® AM + Dowicil® 75 (200 ppm active) | 9.3 | 7.4 |
| Ludox® AM + Grotan® BK (160 ppm active) | 10.2 | 7.4 |

We claim:

1. A method of protecting a colloidal silica aquasol from undesirable bacteria, said method comprising adding to said aquasol a bactericide wherein the bactericide is 200–675 ppm 1-(3-chloroallyl)-3,5,7-triaza-1-azoniaadamantane chloride; 100–350 ppm 1,2-benzisothiazolin-3-one; or 160–800 ppm of 1,3,5-triazine-1,3,5(2H,4H,6H)-triethanol and providing sufficient agitation to dissolve the bactericide in the aquasol.

2. The method of claim 1 wherein the bactericide is 1-(3-chloroallyl)-3,5,7-triaza-1-azoniaadamantane chloride.

3. A colloidal silica aquasol containing about 15–60 weight percent of silica, said silica having particle diameters within the range of 2–100 millimicrons and a bactericide wherein the bactericide is 200–675 ppm 1-(3-chloroallyl)-3,5,7-triaza-1-azoniaadamantane chloride; 100–350 ppm 1,2-benzisothiazolin-3-one; or 160–800 ppm of 1,3,5-triazine-1,3,5(2H,4H,6H)-triethanol.

4. The aquasol of claim 3 wherein the bactericide is 1-(3-chloroallyl)-3,5,7-triaza-1-azoniaadamantane chloride.

* * * * *